United States Patent [19]

Wakabayashi et al.

[11] Patent Number: 4,494,636
[45] Date of Patent: * Jan. 22, 1985

[54] ONE-WAY CLUTCH

[75] Inventors: Shozo Wakabayashi; Kinzo Narita, both of Osaka, Japan

[73] Assignee: Tsubakimoto-Morse Co., Ltd., Osaka, Japan

[*] Notice: The portion of the term of this patent subsequent to Nov. 23, 1999 has been disclaimed.

[21] Appl. No.: 411,394

[22] Filed: Aug. 25, 1982

[30] Foreign Application Priority Data

Mar. 24, 1982 [JP] Japan ................................. 57-45555

[51] Int. Cl.³ .............................................. F16D 41/07
[52] U.S. Cl. .................................. 192/41 A; 192/45.1
[58] Field of Search ............................ 192/41 A, 45.1; 188/82.8; 308/DIG. 4

[56] References Cited

U.S. PATENT DOCUMENTS

| 3,031,053 | 4/1962 | Sauzedde et al. | 192/45 |
| 3,443,672 | 5/1969 | Giese | 188/82.8 |
| 3,651,908 | 3/1972 | Oldfield | 192/41 A |
| 4,360,093 | 11/1982 | Wakabayashi et al. | 192/41 A |

FOREIGN PATENT DOCUMENTS

648281 9/1962 Canada ............................ 192/45.1

Primary Examiner—Rodney H. Bonck
Attorney, Agent, or Firm—Flynn, Thiel, Boutell & Tanis

[57] ABSTRACT

A one-way clutch wherein a plurality of sprags disposed in an annular array are positioned in an annular space between concentric inner and outer rings. Each sprag has a groove formed therein substantially midway between the ends thereof. A garter spring is fitted within the grooves. An annular retainer is disposed within the annular space. The retainer has axially extending parts which are circularly joined together, whereby the axially extending parts positionally hold the sprags. A ringlike side member of generally channel-shaped cross section is confined between and has inner and outer walls which respectively slidably engage the inner and outer rings. These inner and outer walls are joined by a radial side wall which closely confines the sides of the sprags, which side wall has recesses for accommodating the axially extending parts of the retainer. This radial side wall also has radial wall portions which project between the sides of the sprags and the circularly extending parts of the retainer.

5 Claims, 17 Drawing Figures

ONE-WAY CLUTCH

FIELD OF THE INVENTION

This invention relates to a one-way clutch having an annular garter spring and a plurality of sprags inserted between outer and inner rings.

BACKGROUND OF THE INVENTION

Figure 1:
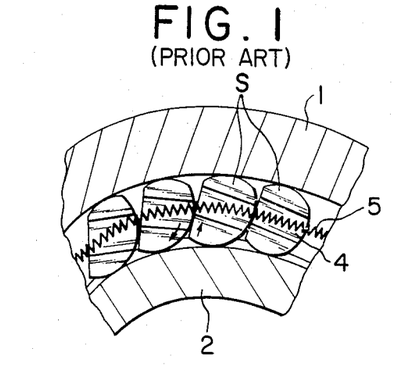
FIGS. 1 and 3 are fragmentary cross-sectional front views of the principal parts of two known clutches.
Figure 2:
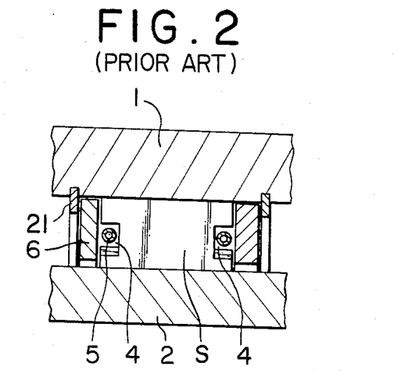
FIGS. 2 and 4 are cross-sectional side elevational views of FIGS. 1 and 3, respectively.

An example of a conventional one-way clutch having no retainers, as shown in FIGS. 1 and 2, uses a plurality of sprags S inserted, one in contact with another, between concentric outer and inner rings 1 and 2, respectively, one of which rotatably drives the other. An annular garter spring 5 is fitted in a groove 4 provided on each side of the sprag. An annular side plate 6 is disposed on each side of the sprag.

Figure 3:
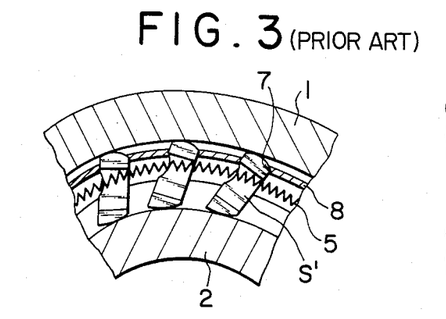
Figure 4:
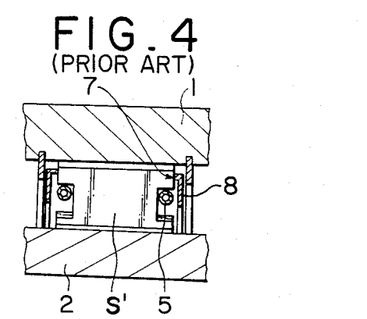

An example of a conventional one-way clutch having a retainer, as shown in FIGS. 3 and 4, uses a plurality of sprags S' inserted at intervals between the outer ring 1 and the inner ring 2. A retainer 8, made of steel sheet punched with a sprag inserting hole 7, is used to keep the sprags spaced at given intervals.

In the former type, shown in FIGS. 1 and 2, each sprag contacts adjacent sprags so that the axis of rotation thereof coincides with those of the outer and inner rings. Thus, the adjacent sprags interfere with each other to prevent smooth motion, with the points of contact moving in opposite directions as indicated by the arrows. Governed by the circumferential length of the outer and inner rings, the number of sprags cannot be decreased according to the required torque. Provision of the groove 4 to insert the garter spring 5 on each side of the sprag reduces the area of contact between the side of the sprag and the annular side plate 6. Consequently, if the sprag gives a localized axial push to the annular side plate 6, localized abrasive wear is likely to occur. Especially if the annular side plate 6 warps outward (in the side not contacting a stopper ring 21), the localized abrasive wear increases, greatly preventing the smooth motion of the sprags.

In the clutch shown in FIGS. 3 and 4, blanking the retainer 8 from thin steel sheet develops burrs which prevent the sprag from moving smoothly along and around the axis, and causes the sprag inserting hole 7 to easily wear.

Figure 5:
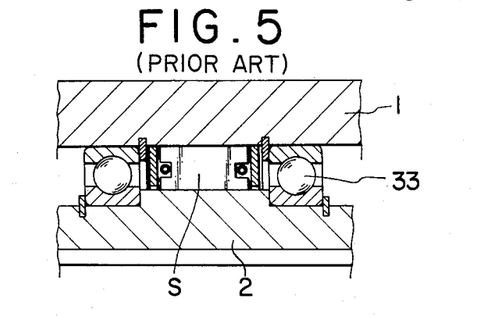
FIG. 5 is a fragmentary cross-sectional front view of another conventional one-way clutch.

Moreover, in the conventional one-way clutch either with or without a retainer, it is necessary to provide an additional bearing 33 between the outer and inner rings as shown in FIG. 5 for the purpose of centering said rings and bearing the radial load during idle rotation.

This invention eliminates the aforementioned shortcomings of conventional one-way clutches.

Our copending application Ser. No. 198 420, filed Oct. 20, 1980, now Pat. No. 4,360,093 discloses therein an improved one-way clutch of the sprag type which eliminates the aforementioned shortcomings of conventional clutches and hence represents a substantial improvement thereover. However, while the improved clutch of the aforesaid application has proven highly desirable, nevertheless further ongoing developments and modifications have been made therein so as to still further improve this one-way sprag clutch with respect to its structure, size and/or performance. More specifically, the improved clutch of this invention incorporates therein an improved side plate member which extends radially between and slidably engages the inner and outer rings, and is axially confined between the sides of the sprags and the circumferentially extending parts of the retainer, whereby the improved side plates members effectively function as a bearing to maintain proper concentricity between the inner and outer rings and even permit idle rotation therebetween, while at the same time effectively resisting side thrust from the sprags so as to insure more uniform torque distribution among the plurality of sprags.

Accordingly, in the improved one-way clutch of the present invention, a plurality of sprags disposed in an annular array are positioned within an annular space between concentric inner and outer rings. Each sprag has a groove formed therein substantially midway between the ends thereof, which groove extends radially relative to the inner and outer rings and is effectively defined by a plane which is substantially perpendicular to the rotational axis of the clutch. A garter spring is fitted within the grooves defined by the plurality of sprags. An annular retainer is disposed within the annular space for holding and positionally confining the sprags. The annular retainer has axially extending parts which extend axially between adjacent sprags for positionally holding the sprags between the inner and outer rings, and which axially extending parts are joined together by circumferentially extending parts. These axially and circumferentially extending parts preferably define adjacent U-shaped portions which alternately open in axially opposite directions. A platelike side member is disposed adjacent each end surface of the plurality of sprags, which side member comprises an annular ring which has inner and outer walls which effectively slidably engage the respective inner and outer rings, which inner and outer walls are joined by a radial side wall which closely slidably confines the adjacent end walls of the sprags. This side member also has a plurality of circumferentially spaced recesses formed radially therein, which recesses accommodate the axially extending parts of the retainer, and the radial side wall of the side member has radially projecting portions which are positionable between the ends of the sprags and the circumferentially extending parts of the retainer.

Other objects and purposes of the invention will be apparent from the following detailed description.

DETAILED DESCRIPTION

Figure 6:
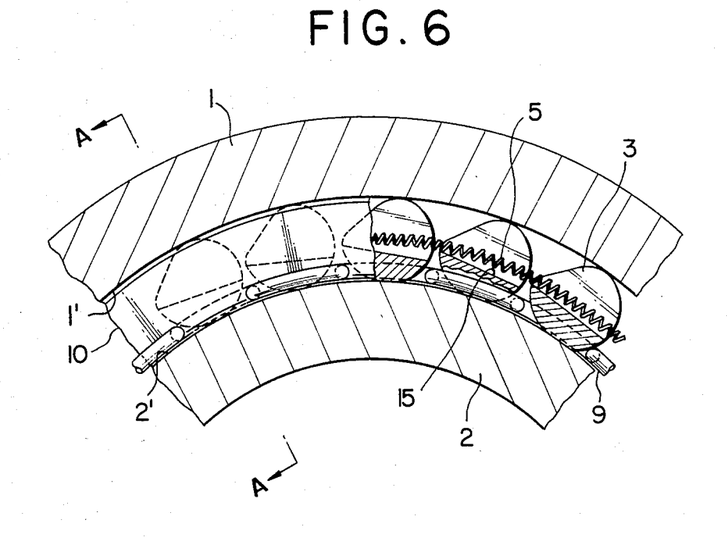
FIG. 6 is a fragmentary cross-sectional front view of an embodiment of the invention.
Figure 7:
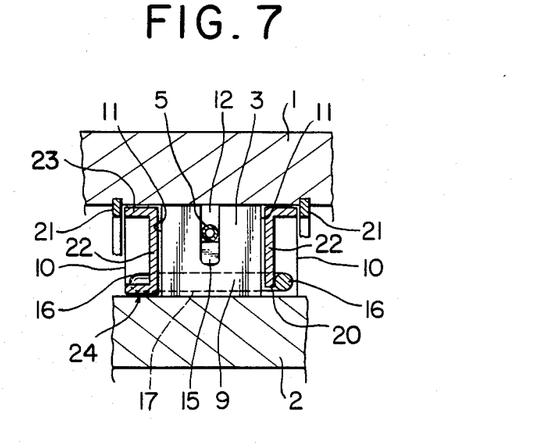
FIG. 7 is a cross-sectional view taken along the line A—A of FIG. 6.
Figure 8:
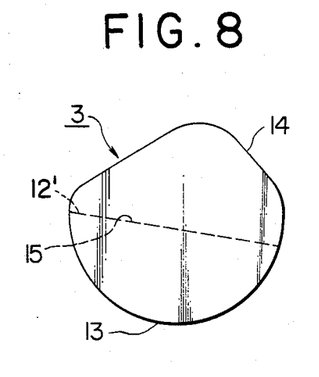
FIG. 8 is a front view of the sprag shown in FIGS. 6 and 7.
Figure 9:
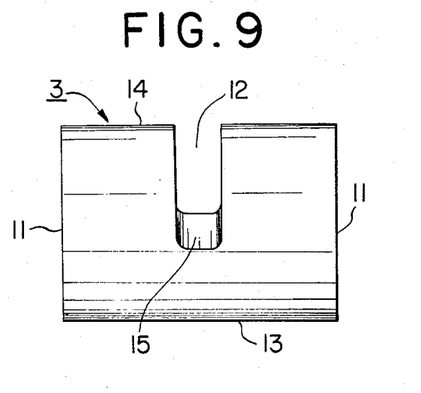
FIG. 9 is a side elevation of the sprag shown in FIG. 8.
Figure 10:
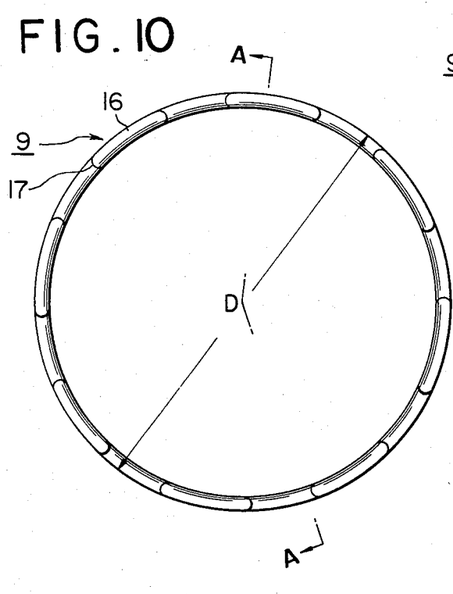
FIG. 10 is a front view of a retainer.
Figure 11:
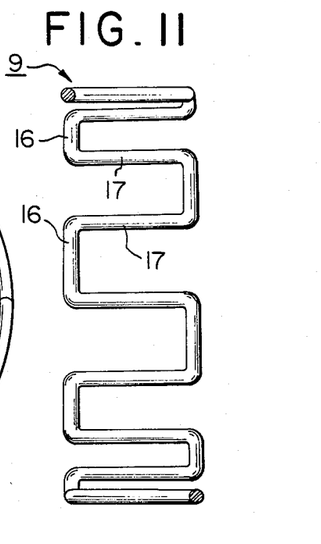
FIG. 11 is a cross-sectional view taken along the line A—A of FIG. 10.
Figure 12:
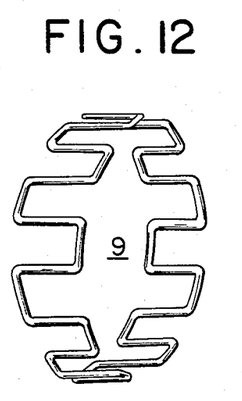
FIG. 12 is a perspective view of the retainer shown in FIGS. 10 and 11.

In the embodiment of the invention illustrated in FIGS. 6 and 7, a plurality of sprags 3 are inserted, one in contact with another, between an outer ring 1 and an inner ring 2 with each sprag 3 being held by means of a garter spring 5 and a retainer 9 in the direction of engagement. As shown in FIGS. 8 and 9, a groove 12 to accommodate the garter spring 5 is formed across the middle of the sprag. The internal sprag surface 13 facing the inner ring 2 is circularly shaped and the external surface 14 facing the outer ring 1 is shaped as an asymmetrical cam surface, as shown in FIG. 8. The groove 12 has a bottom 15 that is inclined so that only one end 12' thereof comes in contact with the garter spring 5 when the sprag is placed between the inner and outer rings. Urged by the garter spring 5, accordingly, the one end 12' brings the internal surface 13 of the sprag 3 into contact with the outer annular surface 2' of the inner ring and the external surface 14 thereof with the inner annular surface 1' of the outer ring. The retainer 9 comprises, as shown in FIGS. 10 to 12, an elastic wire rod having a circular cross section, which is bent alternately to form a circumferentially extending part 16 and an axially extending part 17, with both ends thereof joined together to form an endless ring. The axially extending part 17 is, in this illustrated embodiment, fitted in the triangular space formed between the peripheral surfaces of adjacent sprags 3 and the inner ring 2 and is adapted to contact the circular surface 13 of the sprag 3.

A one-way sprag clutch having the above-described structure is illustrated and described in greater detail in our copending application Ser. No. 198 420, filed Oct. 20, 1980, the disclosure of which is incorporated herein by reference.

According to the improved sprag clutch of this invention as illustrated by FIGS. 6 and 7, the clutch is provided with an improved annular side member 10 provided between the sides 11 of the sprags 3 and the retainer 9. This improved side member 10 positionally cooperates with the retainer and the sides (that is, the end walls) of the sprags for resisting transverse forces, and in addition maintains proper concentricity between the inner and outer rings to maintain proper uniform torque sharing among the plurality of sprags, and can still additionally function as a bearing between the inner and outer rings during the idle rotation of the clutch so as to eliminate the need for additional bearings.

Considering now the construction of the side member 10 in greater detail, as illustrated in FIGS. 6–7 and FIGS. 13–15, this side member 10 is formed as an endless ring having a generally sidewardly opening channel-shaped cross section. The side member 10 includes an annular radial web or side wall 22 having the radially outer end thereof joined to an outer rimlike annular wall 23 which projects axially sidewardly. The radially inner end of side wall 22 is joined to an inner rimlike peripheral wall 24 which also projects axially sidewardly, this latter wall 24 being formed by a plurality of circumferentially spaced portions or segments 18 as described hereinafter.

The side member 10 has an outer diameter as defined by the outer annular wall 23 which is adapted to slidably contact the inner circumference 1' of the outer ring 1, whereas the side member 10 has an inner diameter $d_1$ as defined by the tabs 18 forming the inner wall 24 which is adapted to slidably engage the outer circumference 2' of the inner ring 2.

Figure 13:
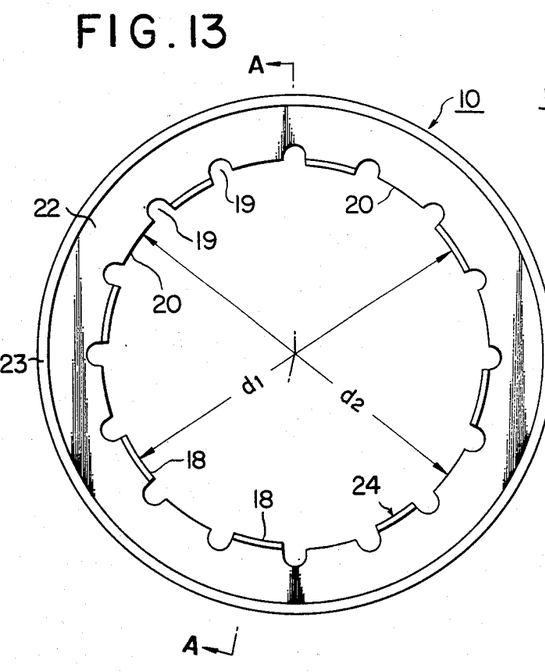
FIG. 13 is a front view of an annular side plate.
Figure 14:
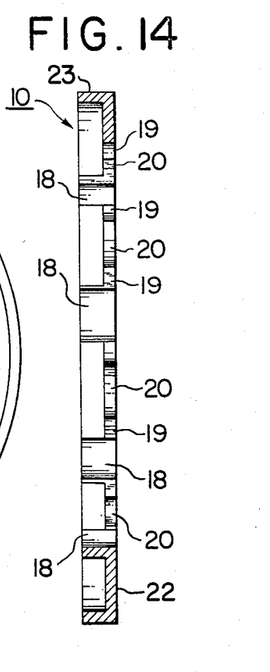
FIG. 14 is a cross-sectional view taken along the line A—A of FIG. 13.
Figure 15:
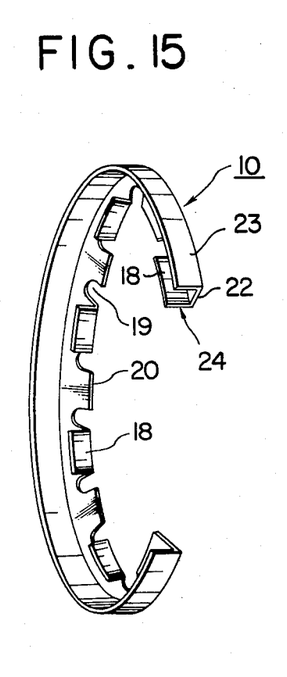
FIG. 15 is a perspective view showing the annular side plate of FIGS. 13 and 14 with a portion thereof removed.

The side member 10 also has a plurality of regularly spaced recesses 19 which open radially inwardly from the inner wall thereof into the side wall 22, which recesses are shaped so as to snugly accommodate therein the cross section of the axially extending portions 17 of the retainer 9. As illustrated by FIG. 13, the inner wall portions 18 are provided between alternate adjacent pairs of recesses 19, whereas the side wall 22 between the remaining adjacent pairs of recesses 19 define radially inwardly projecting wall portions 20 which terminate in free edges defining an inner diameter $d_2$ which is slightly larger than the diameter $d_1$. The outside diameter D (FIG. 10) of the retainer 9 is larger than the inside diameter $d_2$ of the portions 20 associated with the side member 10, whereby these portions 20 hence are snugly positionable axially between the circumferentially extending portions 16 of the retainer 9 and the adjacent end surfaces 11 of the sprags 3. The circumferentially extending part 16 of the retainer 9, which is alternately U-shaped in opposite axial directions, does not interfere, during fitting, with the inner wall 24 of the annular side member 10 if the outside diameter of the retainer 9 is reduced by taking advantage of the elasticity thereof.

In assembling the one-way clutch thus composed, the sprag 3, retainer 9, annular side members 10 and garter spring 5 are fitted en bloc between the outer ring 1 and inner ring 2, and then an axial motion stopper 21 (that is, a conventional split lock ring) is fitted to the outer ring 1. The clutch can be disassembled by reversing the above-described procedure.

This embodiment which is composed as described above has the following advantages:

As the outer ring 1 and inner ring 2 engage and disengage, some of the sprags 3 move axially to the left and some to the right in FIG. 7, because the sprags 3 are not strictly the same in shape or for other reasons. Then, the sprags 3 moving sideways push the annular side members 10 on both sides simultaneously. As shown in FIGS. 6 and 7, however, the circumferentially extending parts 16 of the retainer 9 contact the outside of the projections 20 formed on the annular side wall 22 to keep the side member 10 resistant against such transverse force, in either direction. Accordingly, even thin annular side plates can well support the thrust load of the moving sprags 3. This permits making a compact one-way clutch, by reducing the axial length thereof, except the length of the sprag, to a minimum. The groove 12 to fit in the garter spring 5 is provided in the middle of the external surface 14 of the sprag 3, which prevents the localized abrasive wear of the side of the sprag 3 and, thereby lengthens the service life of the clutch.

Owing to the sliding contact between the outer circumference of the wall 23 of the annular side member 10 and the inner surface 1' of the outer ring 1, and between the sliding portions 18 of the inner circumference of the annular side member 10 and the outer surface 2' of the inner ring 2, concentricity of the outer and inner rings can be maintained. Accordingly, the space between the outer and inner rings in which sprags 3 are inserted can be uniform, so that each sprag shares a uniform torque. This results in one-way clutches with larger torque capacity.

If the annular side member 10 is made of materials (such as copper alloys, or surface coated materials) suitable for a sliding bearing, then the side plate can function as a bearing between the outer and inner rings during the idle rotation of the one-way clutch, whereby additional bearings (such as bearing 33 of FIG. 5) are no longer needed between the outer and inner rings.

Figure 16:
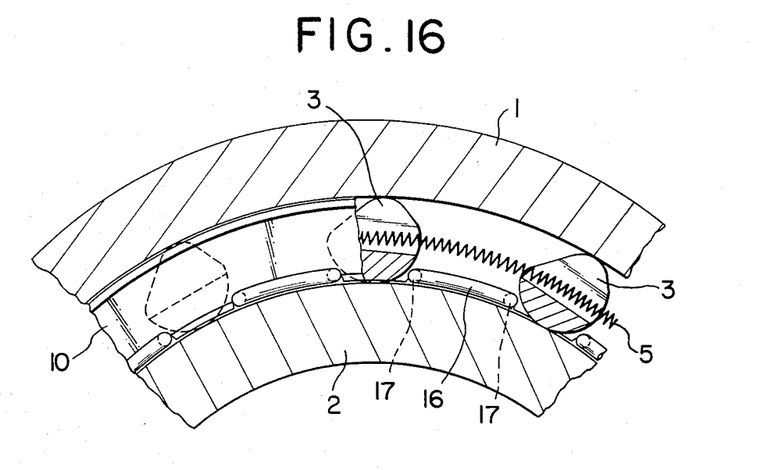
FIG. 16 is a fragmentary cross-sectional front view showing the principal part of an embodiment in which the sprags are inserted at intervals.

Because the axially extending part 17 of the retainer 9 is fitted in the recess 19 of the annular side plate 10, external forces, directed radially outward and circumferentially, which work on the axially extending part 17 of the retainer when the outer and inner rings engage and disengage, are supported by the annular side plates 10. Consequently, the axially extending part 17 of the retainer 9 is prevented from moving in said directions, thereby always keeping the sprag 3, which slidingly contacts the axially extending part 17, in a fixed position. This permits designing a one-way clutch best suited for transmitting the desired torque, by spacing the sprags 3 at suitable intervals as shown in FIG. 16. Namely, the number of the sprags can be increased or decreased according to the amount of torque involved by placing the sprag at every second section of the retainer, as shown in FIG. 16 or at every third section and so on.

Because the retainer 9 can be made of a wire rod of circular cross section, the sprag 3 and the retainer 9 can contact by means of curved surfaces, thereby making the rotation of the sprag 3 and operation of the one-way clutch smoother.

This invention is by no means limited to the above-described embodiments. With reference to FIG. 6 for example, the retainer 9 may be disposed adjacent the inside of the outer ring 1. The sprag 3 may be turned upside down to turn the groove 12 toward the inner ring 2. Further, a compression spring urging outwardly may be fitted in the groove 12. In this case, the recesses 19 are provided along the external boundary of the annular side member 10, and inner wall 24 could be continuous and outer wall 23 would be segmented.

Figure 17:
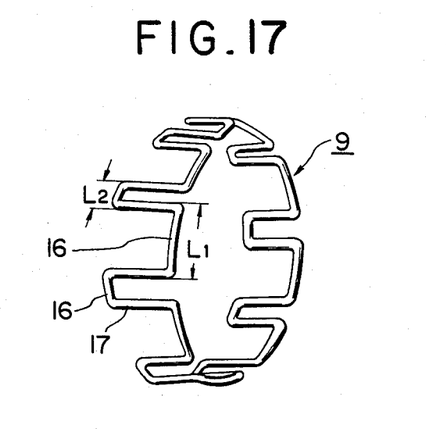
FIG. 17 is a perspective view showing the retainer used in the embodiment of FIG. 16.

In order to suitably vary the intervals between the sprags 3, the retainer 9 may have circumferentially extending parts 16 of different lengths ($L_1$ and $L_2$) at one end of the axially extending part and the other, as shown in FIG. 17.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a one-way clutch having a plurality of annular sprags inserted between an inner and an outer ring, a radially opening groove formed in each sprag between the sides thereof, a spring fitted in said groove to urge the sprag toward the engaging direction, an annular retainer comprising a wire rod bent into alternately U-shaped sections each having an axially extending part and a circumferentially extending part, the axially extending part of the retainer holding the sprag in conjunction with the spring, a pair of annular side plates disposed between said circumferentially extending parts and both sides of the sprags, the side plate having a recess in the peripheral edge thereof into which said axially extending part fits to prevent the retainer from moving, and the sprag having an external shape for permitting rotational contact with the axially extending part of the retainer as the sprag moves into and out of engagement with the inner and outer rings, comprising the improvement wherein the side plates have outer and inner circumferences in sliding contact respectively with the inner surface of the outer ring and the outer surface of the inner ring.

2. In a one-way clutch having concentric inner and outer rings which respectively define thereon radially spaced inner and outer annular surfaces which define an annular space therebetween, a plurality of circumferentially spaced sprags disposed in an annular array and positioned within said annular space for clutching engagement with said inner and outer annular surfaces, each sprag having a radial groove formed therein in sidewardly spaced relationship from the end surfaces of the respective sprag, and a spring fitted within the groove defined by said sprag for urging the sprag in an engaging direction, an annular sprag retainer positioned within said space and having alternate U-shaped sections which open axially in opposite directions, each U-shaped section having an axially upstanding part which extends axially through the space in close proximity to one of the sprags and a circumferentially extending part which extends circumferentially of said space and fixedly joins adjacent axially extending parts, said circumferentially extending part being positioned axially adjacent but spaced axially outwardly from the end surface of the sprag, and a pair of annular platelike side members disposed within said space adjacent the opposite axial ends of said plurality of sprags, comprising the improvement wherein each side member includes radially inner and outer rimlike peripheral walls which are radially spaced apart and are rigidly joined together by a radially extending side wall, said side wall being disposed directly adjacent and engageable with the exposed end surfaces of said sprags, the radially inner and outer walls projecting axially outwardly of said side wall and being disposed in slidable engagement with the respective inner and outer annular surfaces formed on said inner and outer rings, said side member having a plurality of circumferentially spaced recesses formed therein and extending radially inwardly into the side wall from one of the peripheral boundaries thereof, said recesses accommodating and closely confining therein the axially extending parts of said retainer, and said side wall of said side member also having portions thereof interposed axially between the circumferentially extending parts of said retainer and the adjacent end surfaces of the sprags.

3. A clutch according to claim 2, wherein the radial side wall of said side member includes a plurality of said portions spaced circumferentially and projecting radially so as to terminate in a free edge, said radially projecting portions being disposed between alternate pairs of said recesses so as to be positionable axially between the circumferentially extending parts and the adjacent end surfaces of the sprags.

4. A clutch according to claim 3, wherein said recesses project radially into the side wall from the inner peripheral edge thereof, wherein said inner rimlike wall is joined to said radial side wall between the remaining adjacent pairs of recesses, and wherein said spring comprises a garter spring fitted within the grooves defined by the plurality of sprags.

5. A clutch according to any one of claims 2–4, wherein the side member is constructed of or coated with a suitable bearing material so that the side member functions as a bearing for permitting relative rotation between the inner and outer rings when the clutch is disengaged, said clutch being free of additional bearings between the inner and outer rings.

* * * * *